United States Patent [19]
Huang

[11] Patent Number: 5,900,938
[45] Date of Patent: May 4, 1999

[54] LASER MEASUREMENT SYSTEM FOR RAPID CALIBRATION OF MACHINE TOOLS

[75] Inventor: Peisen S. Huang, Nesconset, N.Y.

[73] Assignee: The Research Foundation of State University of New York, Albany, N.Y.

[21] Appl. No.: 08/745,607

[22] Filed: Nov. 8, 1996

[51] Int. Cl.$^6$ .............................. G01B 9/02; G01B 11/26
[52] U.S. Cl. ......................... 356/358; 356/351; 356/363; 356/138; 356/141.2; 356/141.3
[58] Field of Search ..................................... 356/358, 363, 356/351, 72, 141.2, 141.3, 4.09, 4.1, 138

[56] References Cited

U.S. PATENT DOCUMENTS

| | | | |
|---|---|---|---|
| 4,435,905 | 3/1984 | Bryan . | |
| 4,790,651 | 12/1988 | Brown et al. | 356/358 |
| 5,064,298 | 11/1991 | Bockman | 356/363 |
| 5,220,397 | 6/1993 | Huang et al. . | |
| 5,418,611 | 5/1995 | Huang et al. | 356/141.2 |

OTHER PUBLICATIONS

"Angle Measurement Based on the Internal–Reflection Effect Using Elongated Critical–Angle Prisms," P.S. Huang and J. Ni, *Applied Optics*, vol. 35, No. 13, pp. 2239–2241, May 1, 1996.

"Angle Measurement Based onthe Internal–Reflection Effect and its Application in theMeasurement of Geometric Errors of Machine Tools," P.S. Huang and J. Ni, Paper Presented at ASPE 1993 Annual Meeting, Seattle, Washington, Nov. 7, 1993, page nos. not available.

"Angle Measurement Based on the Internal–Reflection Effect and the Use of Right–Angle Prisms," P.S. Huang and J. Ni, *Applied Optics*, vol. 34, No. 22, pp. 4976–4980, Aug. 1, 1995.

"Optical Probe for Surface Profiling of Aspherical Mirrors," P.S. Huang and X. Xu, Paper Presented at ASPE 1995 Annual Meeting, Austin, Texas, Oct. 15, 1995, page nos. not available.

"A Multi–Degree–of–Freedom Measuring System for CMM Geometric Errors," J. Ni, P.S. Huang and S.M. Wu, *ASME Journal of Engineering for Industry*, vol. 114, pp. 362–369, Aug. 1992.

"Design and Testing of a Laser Ball Bar for Rapid Machine Tool Metrology," John C. Ziegert and Christopher D. Mize, *Proc. ASPE Annual Meeting*, pp. 86–89, 1993.

"Measurement of Machine Tool Parametric Errors Using the Laser Ball Bar," John C. Ziegert, *Proc. ASPE Annual Meeting*, pp. 76–79, 1994.

"Modeling and Prediction of Thermally Induced Error Maps in Machine Tools Using a Laser Ball Bar and a Neural Network," Narayan Srinivasa and John C. Ziegert, The American Society for Precision Engineering, 1995 Proceedings, vol. 12, pp. 404–407, 1995.

(List continued on next page.)

*Primary Examiner*—Frank G. Font
*Assistant Examiner*—Amanda Merlino
*Attorney, Agent, or Firm*—Hoffmann & Baron, LLP

[57] ABSTRACT

A laser measurement system for rapid calibration of machine tools includes a measurement enhancement device which enables an existing standard single degree of freedom laser interferometry system to simultaneously measure up to four additional degrees of freedom. The device includes a first beamsplitter which splits a laser beam of the existing system, and a measurement component which receives the split beam and senses at least one value for at least a second degree of freedom. The beamsplitter and measurement component are mounted in a compact housing which is configured for attachment to the existing system. The measurement component can employ a new type of compact angle measurement device according to the invention. The new angle measurement device is based on the internal reflection effect and requires only a single prism for each angular component to be measured.

13 Claims, 9 Drawing Sheets

OTHER PUBLICATIONS

"Angle Measurement Based on the Internal–Reflection Effect: A New Method," P.S. Huang, S. Kiyono and O. Kamada, *Applied Optics*, vol. 31, No. 28, pp. 6047–6055, Oct. 1, 1992.

"Hewlett Packard Ordering Sheet for HP 5529A Dynamic Calibrator," 4 pages plus cover sheet, Aug. 1992.

"Sales Brochure for Renishaw Laser Calibration System," 1990, Reinshaw Inc., page nos. not available.

"Reinshaw Brochure on Dynamic Data Capture and Analysis," 1992, Reinshaw Inc., page nos. not available.

"Mark–Tech Laser Inc. Brochure on Model 7980 Lasergage™," undated, Mark–Tech Laser Inc, page nos. not available.

"HP 5528A Laser Measurement System Technical Data," Nov. 1987, Hewlett Packard, pp. 1–15.

"A New Microcomputer–Controlled Laser Dimensional Measurement and Analysis System," Robert C. Quenelle and Lawrence J. Wuerz, Hewlett–Packard Journal, pp. 3–13, Apr. 1983.

"Precision Measurement and Sensing Instruments for Manufacturing", "Automated Precision, Inc. Catalog," 1996, pp. 1–16.

LASER MEASUREMENT SYSTEM FOR RAPID CALIBRATION OF MACHINE TOOLS

BACKGROUND OF THE INVENTION

The present invention relates generally to measurement systems, and, more particularly, to a laser measurement system for rapid calibration of machine tools.

Calibration of machine tools is an essential operation in the machine tool industry. Such calibration is routinely performed to keep machines operating at peak performance so that they produce high-quality products. Calibration is typically carried out for error mapping of computer numerical controlled machines for error compensation, for acceptance testing of newly acquired machine tools, for periodic calibration to obtain optimized performance, for trouble shooting, and for demonstration of quality to potential customers.

It is highly desirable that calibration be performed as quickly as possible. When time-consuming calibration processes are used, costs are incurred due to downtime of the machine tool being calibrated and due to the labor cost incurred for the skilled technicians hired to perform the calibration process.

The most common type of calibration tool employed today is the laser interferometer, such as the model HP5529A dynamic calibrator available from Hewlett Packard. Similar systems are available from Renishaw Inc. of Schaumburg, Ill. and from Mark-Tech Laser Inc. of San Jose, Calif. Typical systems include a laser head, linear interferometer for distance measurement, angular interferometer for angular measurement, straightness interferometer for straightness measurement, fixed and moving retroreflectors (corner reflectors), clamping devices/mounting bases, graphics displays and signal processing boards. Although such modern laser interferometer systems combine sophisticated optics and electronics with powerful software to simplify set up procedures and speed up data sampling and analysis, they still are only able to measure one error component at a time. Each axis of a given machine tool has six error components, namely, displacement, two transverse straightness components, pitch, yaw and roll. Accordingly, the time needed for calibration can be reduced by configuring a system which is capable of measuring more than one degree of freedom per axis simultaneously.

Recognizing the desirability of measuring multiple error components simultaneously, several stand-alone multiple degree of freedom systems have been proposed or developed. One such system is available from Automated Precision, Inc., 7901-C Cessna Avenue, Gaithersburg, Md. 20879. This device is capable of measuring distance with an interferometer, straightness with a position sensing detector, and angle with an auto collimator. However, this device, as well as other known multiple degree of freedom devices, are not compatible with the standard laser interferometers such as those from Hewlett Packard, Renishaw, and Mark-Tech. Purchase of a separate, stand-alone multiple degree of freedom system may be prohibitively expensive for a company which already owns a standard system, such as the Hewlett-Packard system. Accordingly, it would be highly desirable to develop a compact, inexpensive add-on system which would add multiple degree of freedom capability to existing systems such as the Hewlett Packard, Renishaw, and Mark-Tech systems.

One impediment which has heretofore prevented successful development of a compact system is the inherently bulky nature of most prior art angle measurement devices. U.S. Pat. Nos. 5,220,397 and 5,418,611, both to Huang et al., the disclosures of both of which are hereby expressly incorporated herein by reference, set forth a technique for angular measurement using total internal reflection, which has the potential for a more compact angle measurement device. However, the systems set forth in the '397 and '611 patents still require at least two prisms to obtain angular measurement. There is, therefore, a need in the prior art for a laser measurement system for rapid calibration of machine tools which is capable of operation with existing single degree of freedom laser interferometry systems to enhance their capability to simultaneously measure multiple degrees of freedom. There is also a need for an angular measurement apparatus and method which can be used with such a laser measurement system, and which employ simple, compact hardware.

SUMMARY OF THE INVENTION

The present invention, which addresses the needs of the prior art, provides a measurement enhancement device for use in conjunction with a single degree of freedom laser interferometry measurement system. The present invention also provides an angular measurement apparatus and method which are particularly suited for use with the measurement enhancement device. The measurement enhancement device includes a first beamsplitter which splits a laser beam of the measurement system into a first beam for use by an existing component of the system and a second beam for use by the measurement enhancement device. The device also includes a measurement component which simultaneously receives the second beam for determination of a measurement value for at least a second degree of freedom in response to the second beam, and the device further includes a compact housing which supports the first beamsplitter and the measurement component and is configured for attachment to the existing single degree of freedom laser interferometry measurement system.

In a preferred embodiment, the measurement component of the measurement enhancement device includes a second beamsplitter which splits the second beam into third and fourth beams, a position sensing detector which receives the third beam and determines first and second straightness errors in response to the third beam, a third beamsplitter which receives the fourth beam and splits the fourth beam into fifth and sixth beams, a pitch-sensing device which receives the fifth beam and determines a pitch measurement in response thereto, and a yaw-sensing device which receives the sixth beam and determines a yaw measurement in response thereto. The pitch-sensing device and the yaw-sensing device are each preferably a single-prism internal reflection prism sensor of a new type described below.

The preferred type of single prism measuring device is an angular measurement apparatus in accordance with the present invention, which includes a prism having at least three surfaces including an input surface, an interface/measuring surface, and an exit surface. The prism is configured to receive an input light beam through the input surface, at least a portion of which passes through the prism and is reflected from the interface/measuring surface and out through the exit surface. The apparatus for measuring angles also includes an intensity comparator which determines a parameter S equal to a ratio of an input beam intensity to a reflected beam intensity and which relates the parameter S with a quasi-linearized slope parameter K, determined in a region of optimum S-parameter linearity and acceptable S-parameter sensitivity, to obtain the angle to be measured. Preferably, the intensity comparator includes a first intensity measurer which directly measures the reflected beam intensity and forms a first output indicative thereof, a second intensity measurer which directly measurers a transmitted beam intensity and forms a second output indicative thereof, and an S-parameter determinator which forms an output from a ratio of a sum of said first and second outputs to said first output.

In an alternative embodiment of apparatus for measuring angles, the intensity comparator determines a value of the reflectance R equal to a ratio of a reflected beam intensity to an input beam intensity, and correlates the value of R via a non-linear interpolation scheme to obtain an angle to be measured.

The present invention also provides a method for measuring angles. The method of the present invention includes the steps of determining intensity of a first light beam which impinges on an interface/measuring surface of a prism (the first light beam has a first light beam intensity), determining intensity of a second light beam which reflects from the interface/measuring surface when the first beam impinges thereon (the second light beam has a second light beam intensity), comparing the first light beam intensity and the second light beam intensity to obtain a parameter S equal to a ratio of the first light beam intensity to the second light beam intensity, and relating the parameter S with a quasi-linearized slope parameter K to provide the value of the angle to be measured. Most preferably, the method further comprises the additional step of directly measuring intensity of a third light beam which is transmitted through the interface/measuring surface of the prism when the first beam impinges thereon. The third light beam has a third light beam intensity. Further, most preferably, in the method of the present invention, the step of determining intensity of the second light beam includes directly measuring the second light beam intensity, and the step of determining intensity of the first light beam includes summing the second light beam intensity and the third light beam intensity.

In an alternative method, the comparing step instead comprises comparing the first and second light beam intensities to obtain a value of reflectance R equal to a ratio of the second light beam intensity to the first light beam intensity. The relating step is replaced by a correlating step which involves correlating the value of R via a non linear interpolation scheme to obtain an angle to be measured.

As a result, the present invention provides a laser measurement system for rapid calibration of machine tools which permits simultaneous measurement of multiple degrees of freedom using simple, inexpensive hardware which is compatible with existing equipment. The system can be made available to users of existing equipment to permit them to add multiple degree of freedom measurement capability at low cost, and to enhance certainty and accuracy of machine tool operations. The invention further provides an apparatus for measuring angles which is far more compact than existing angle-measurement devices, and which enables the laser measurement system of the present invention to be configured in a compact housing which can readily interface with existing single degree of freedom laser measurement systems. The invention still further provides a simple, accurate method for measuring angles which can be easily carried out using the apparatus for measuring angles of the present invention.

For better understanding of the present invention, together with other and further objects and advantages, reference is made to the following description, taken in conjunction with the accompanying drawings, and its scope will be pointed out in the appended claims.

DETAILED DESCRIPTION OF THE INVENTION

Figure 1:
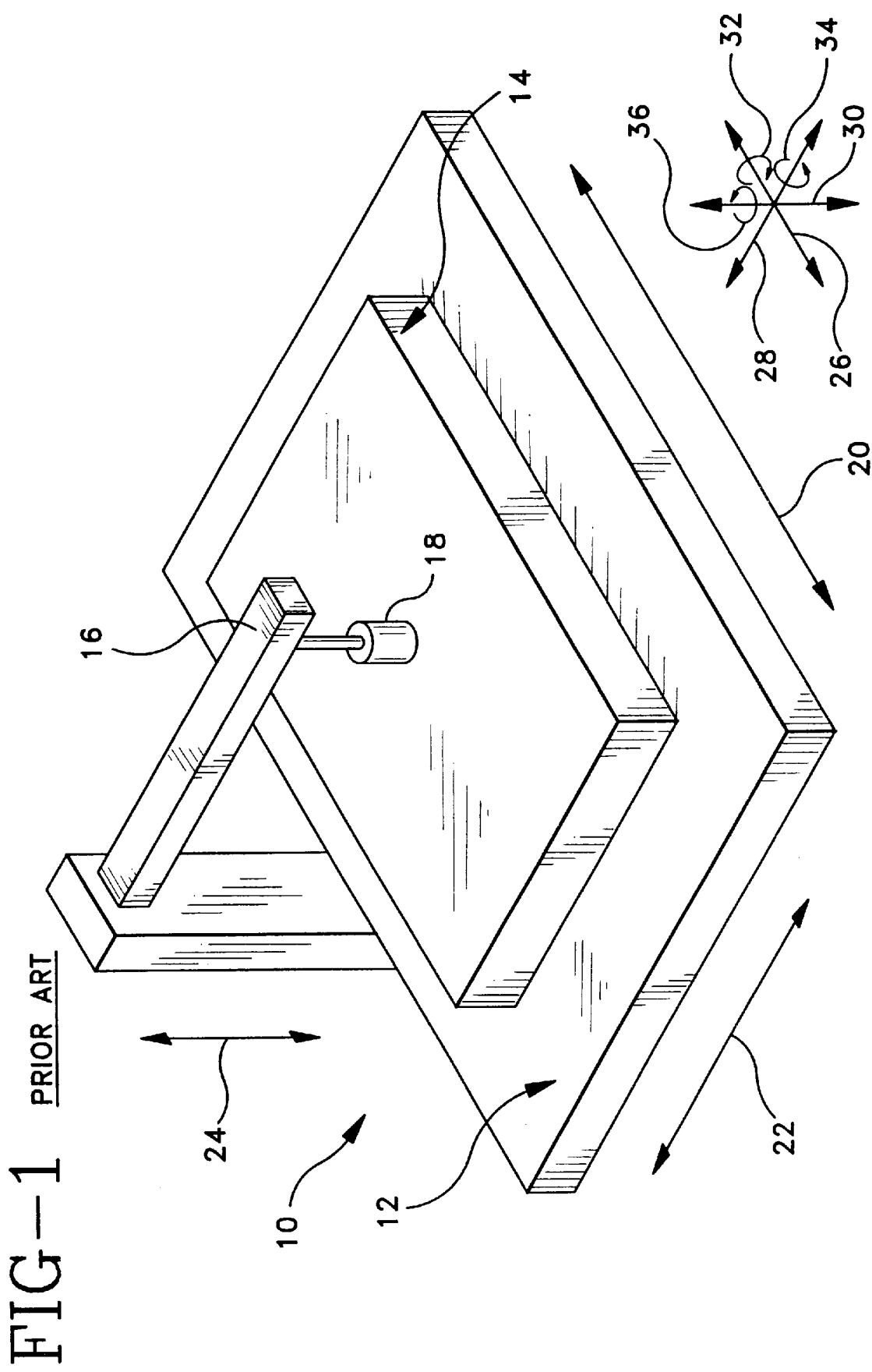
FIG. 1 is a perspective view of a milling machine, as known in the prior art, showing typical error components associated therewith.
Figure 3:
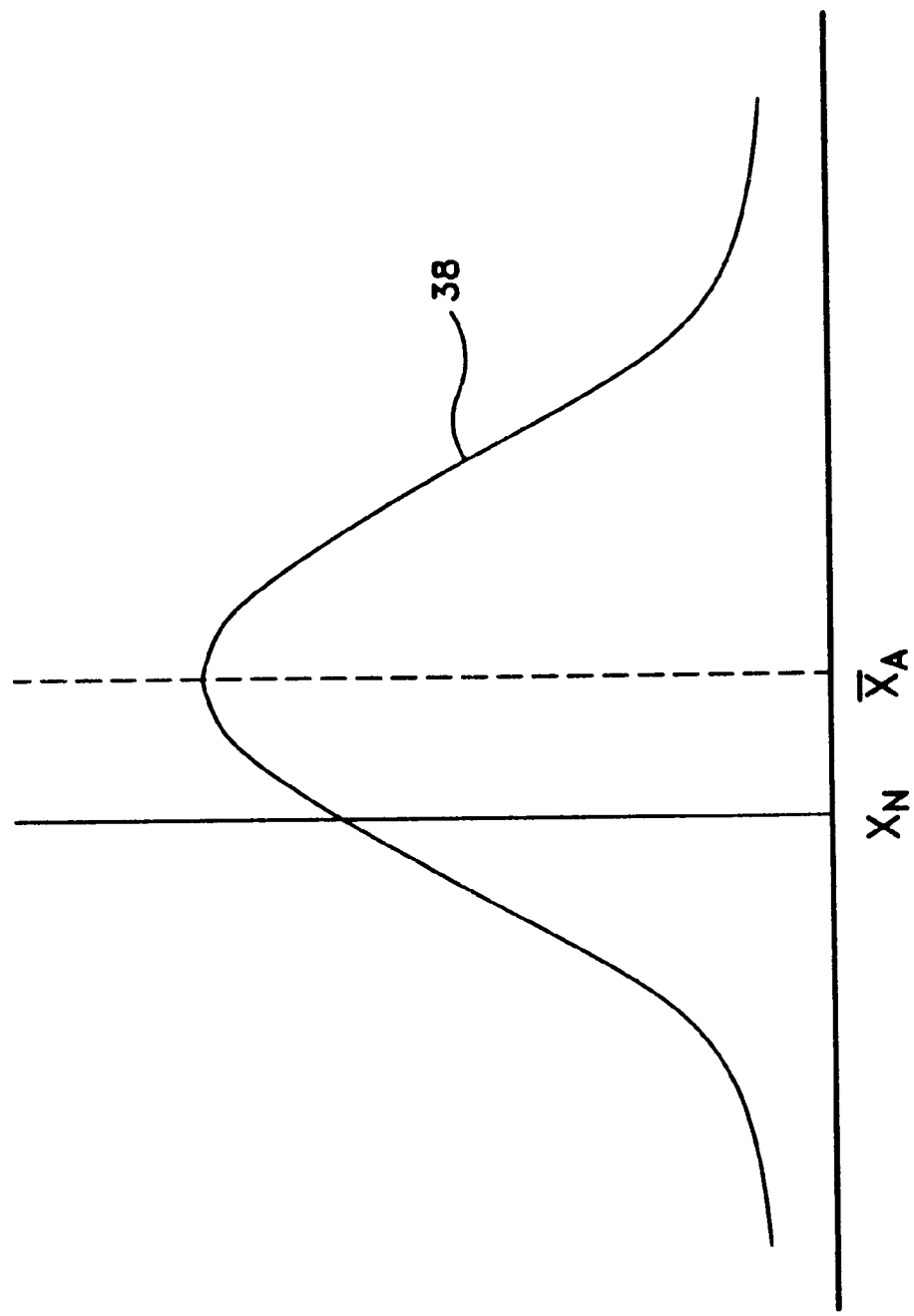
FIG. 3 is an error plot of a typical coordinate position, as known in the prior art.

For a full understanding of the present invention, reference should first be had to FIG. 1, which shows a three axis milling machine as known in the prior art. Machine 10 includes a base 12, a moveable table 14, and a head 16. A tool 18 may be mounted in a quill (not shown) of head 16. Table 14 is capable of motion in two directions designated as 20 and 22. Head 16 is capable of motion in direction 24. As shown illustratively adjacent direction 20, each of directions 20, 22, 24 has six possible error components. These include positioning error 26, first transverse (horizontal) straightness error 28, second transverse (vertical) straightness error 30, roll 32, pitch 34 and yaw 36. Referring now to FIG. 3, a plot is presented of position (represented by arrow 26 in FIG. 1). The parameter $X_N$ represents the desired position to which Table 14 is to move in direction 20. The parameter $\overline{X}_A$ represents the average of the actual positions to which Table 14 moves when commanded to move to position $X_N$. These follow a standard Gaussian error curve 38. The purpose of calibration is to quantify the errors shown in FIG. 3. It is then possible to perform a compensation procedure to change the control software so that the position command will cause $\overline{X}_A$ to coincide with $X_N$. This is an elimination of systematic errors. It will be appreciated that elimination of random errors, represented by curve 38, is far more difficult.

Figure 2:
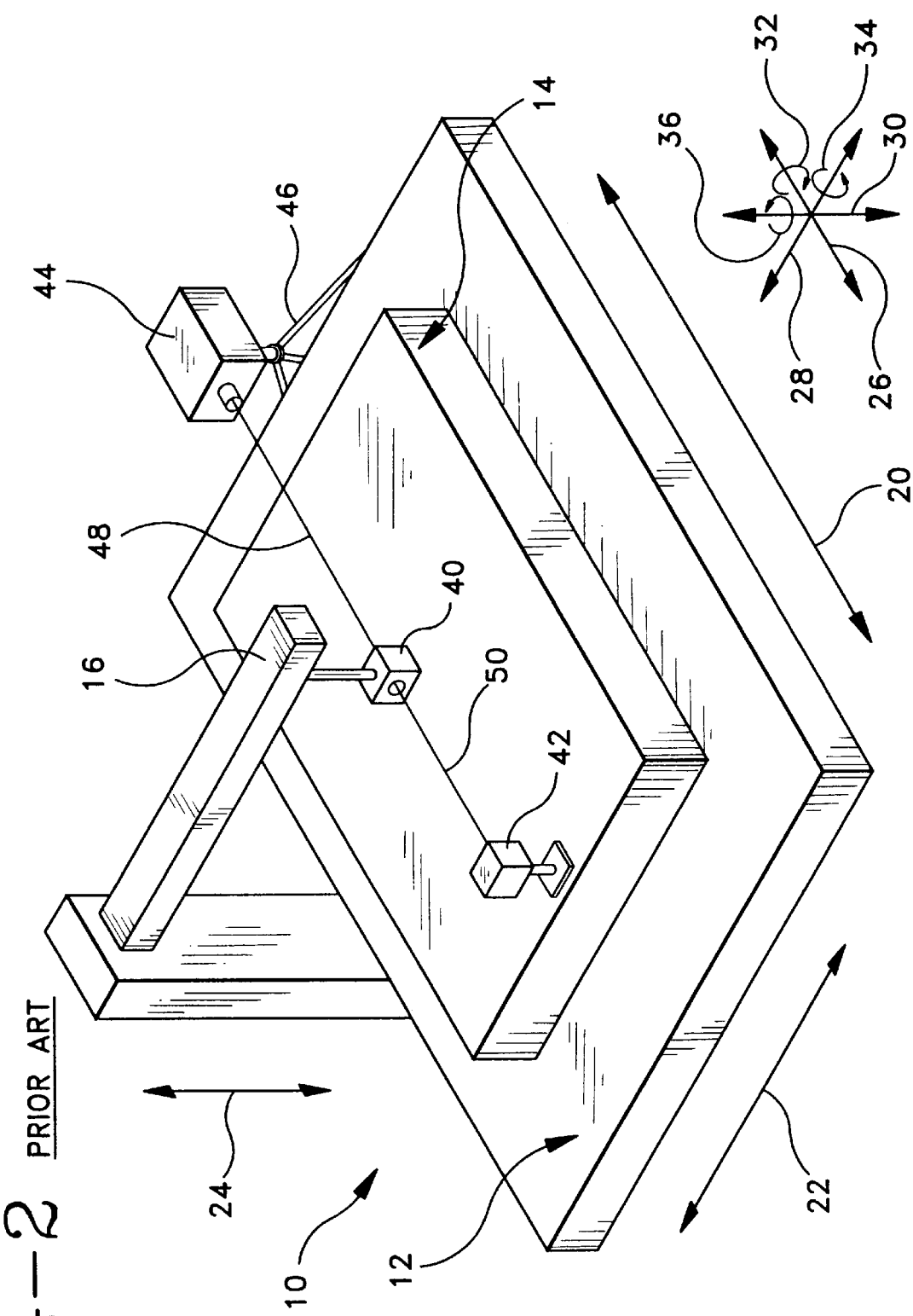
FIG. 2 is a perspective view of the milling machine of FIG. 1 with a typical prior art single degree of freedom laser interferometry measurement system set up therewith.

Referring now to FIG. 2, there is depicted the three axis milling machine of FIG. 1, in use with a conventional single degree of freedom laser interferometry system. Items which are identical to those in FIG. 1 have received the same reference characters. It is to be understood that, although FIGS. 1 and 2 depict a three axis milling machine, both the prior art laser interferometry systems and the present invention are capable of use with any type of machine tool, as well as with coordinate measurement machines, or in any circumstances where errors associated with linear motion must be determined. In FIG. 2, tool 18 has been replaced by a fixed interferometer and stationary retroreflector assembly 40, which is part of the conventional laser interferometry measurement system. The system also includes a laser head 44 mounted on a tripod 46, and a moving retroreflector 42 secured to moveable table 14. A laser beam 48 is produced by laser head 44 and passes through fixed interferometer and stationary retroreflector assembly 40. Any suitable wavelength and power level can be employed with the present invention; typical systems use a 632.8 nm frequency-stabilized helium neon laser operating at a power level of about 5 mW.

The interferometer of assembly 40 splits beam 48 into a reference beam and a measuring beam. The measuring beam 50 exits assembly 40 and bounces off moving retroreflector 42. It is then reflected back into head 44, displaced a distance away from beams 48 and 50 (this distance is not shown in FIG. 2). As is well known in the art, the conventional single degree of freedom laser interferometry system makes measurements in response to phase and/or frequency differences between the reference beam and the measuring beam 50. In order for the conventional system shown in FIG. 2 to measure other error components associated with direction of motion 20 of moveable table 14, fixed interferometer and stationary retroreflector assembly 14 and moving retroreflector assembly 42 must be replaced with other components. This must be repeated for each additional measurement to be taken.

Figure 4:
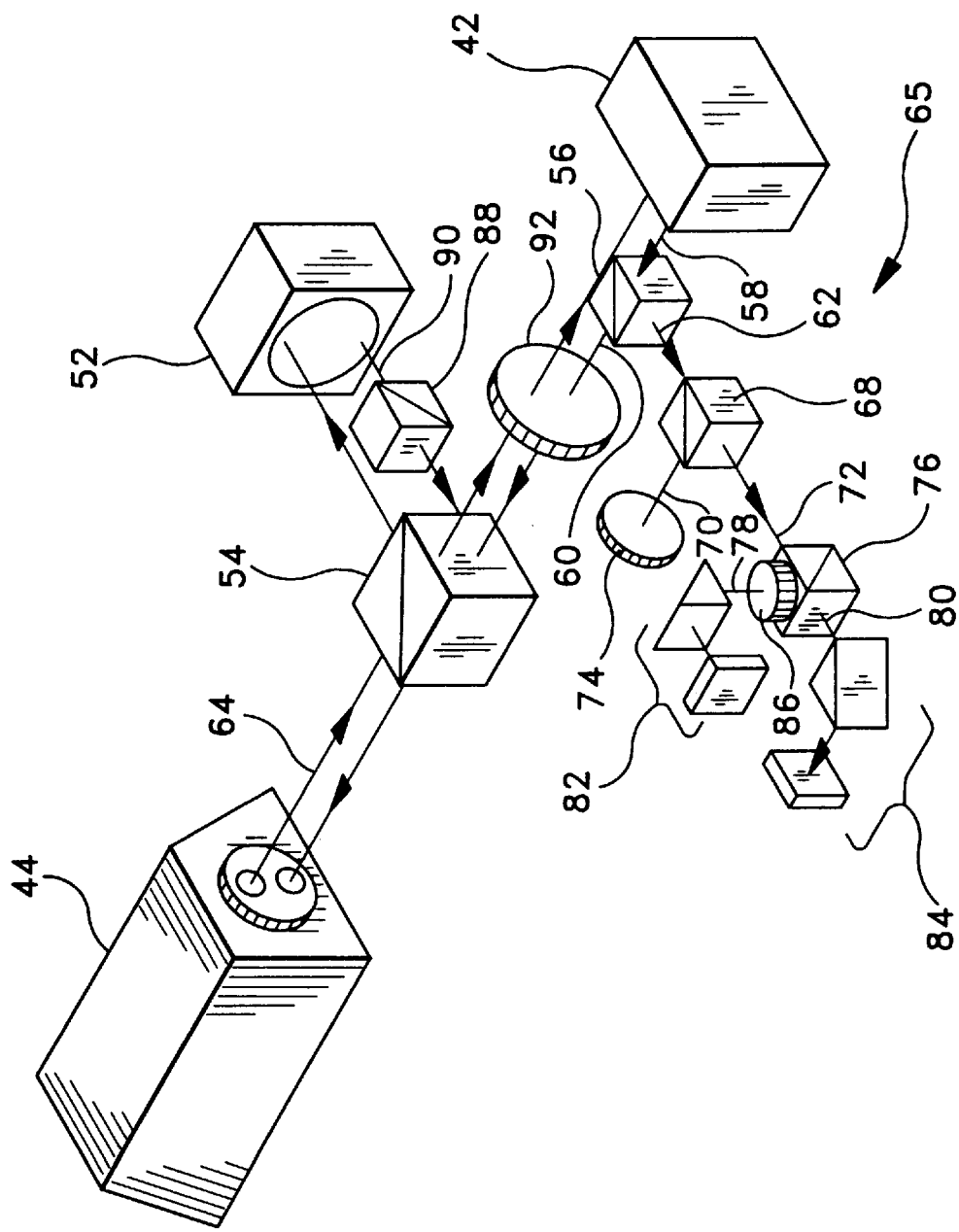
FIG. 4 is a perspective view of a laser measurement system for rapid calibration of machine tools in accordance with the present invention.

Referring now to FIG. 4, there is shown a laser measurement system for rapid calibration of machine tools in accordance with the present invention. The system includes a measurement enhancement device which is configured to be employed with a conventional laser interferometry system. The conventional laser interferometry system includes laser head 44, moving retroreflector 42, and a fixed interferometer and stationary retroreflector assembly. The latter assembly includes a stationary retroreflector 52 and an interferometer such as linear interferometer 54. The remainder of the components depicted in FIG. 4 are elements of the measurement enhancement device according to the present invention. The measurement enhancement device includes a first beamsplitter 56 which splits a laser beam of the existing measurement system, such as return laser beam 58, into a first beam 60 for use by an existing component of the existing interferometry system, and a second beam 62 for use by the measurement enhancement device. First beam 60 may pass, for example, back through the linear interferometer 54 into laser head 44, displaced from output beam 64. Thus, both linear interferometer 54 and laser head 44 are existing components of the conventional single degree of freedom laser interferometry measurement system which employ first beam 60.

The measurement enhancement device also includes a measurement component (designated generally as 65) which simultaneously receives second beam 62 for determination of a measurement value for at least a second degree of freedom in response to second beam 62. Measurement component 65 is preferably capable of determining a measurement value for each of four additional degrees of freedom, and it is most preferably formed of elements which are depicted in FIG. 4 and which will be described below. The four additional degrees of freedom are preferably horizontal straightness, vertical straightness, pitch and yaw. It would be desirable to add a fifth degree of freedom (roll). However, measurement of roll to an accuracy of less than 1 arc second (as required by modern machine tools) is very challenging.

Figure 5:
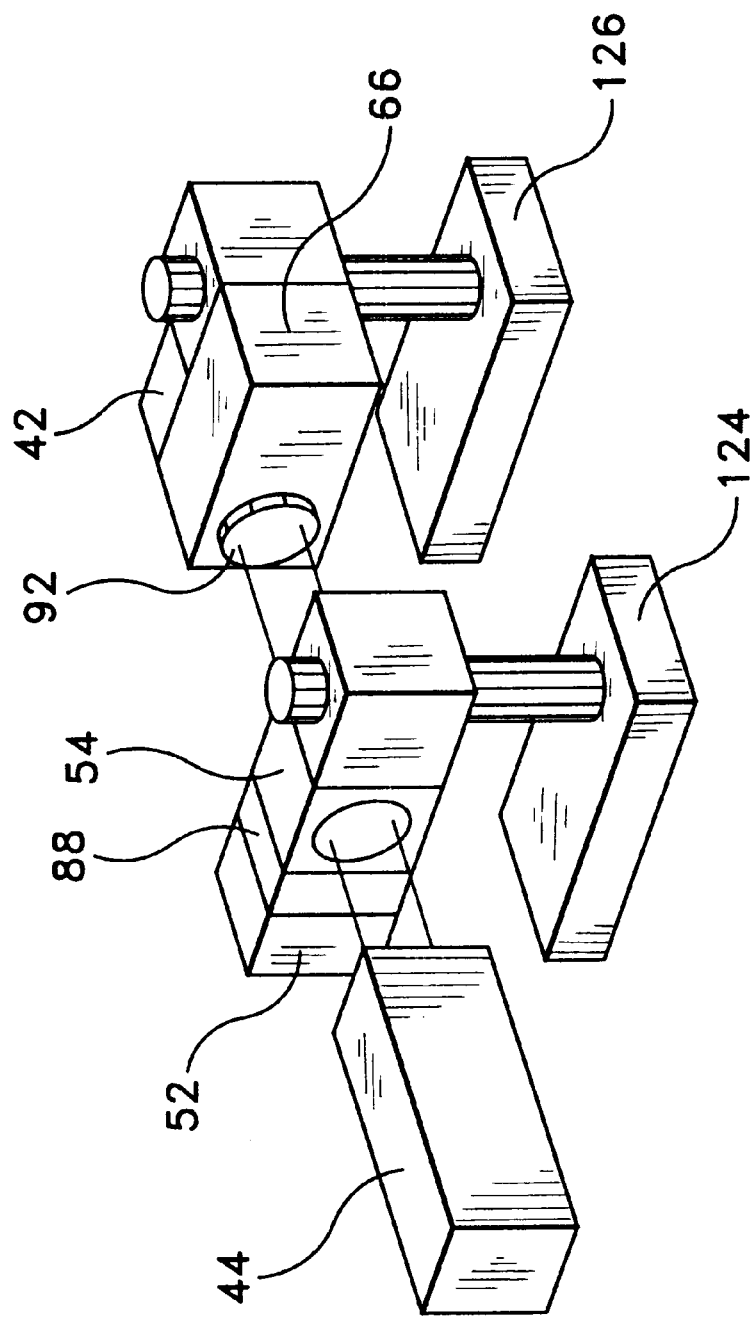
FIG. 5 is a perspective view of the system of FIG. 4 configured in a compact housing and assembled with an existing single degree of freedom system.
Figure 9:
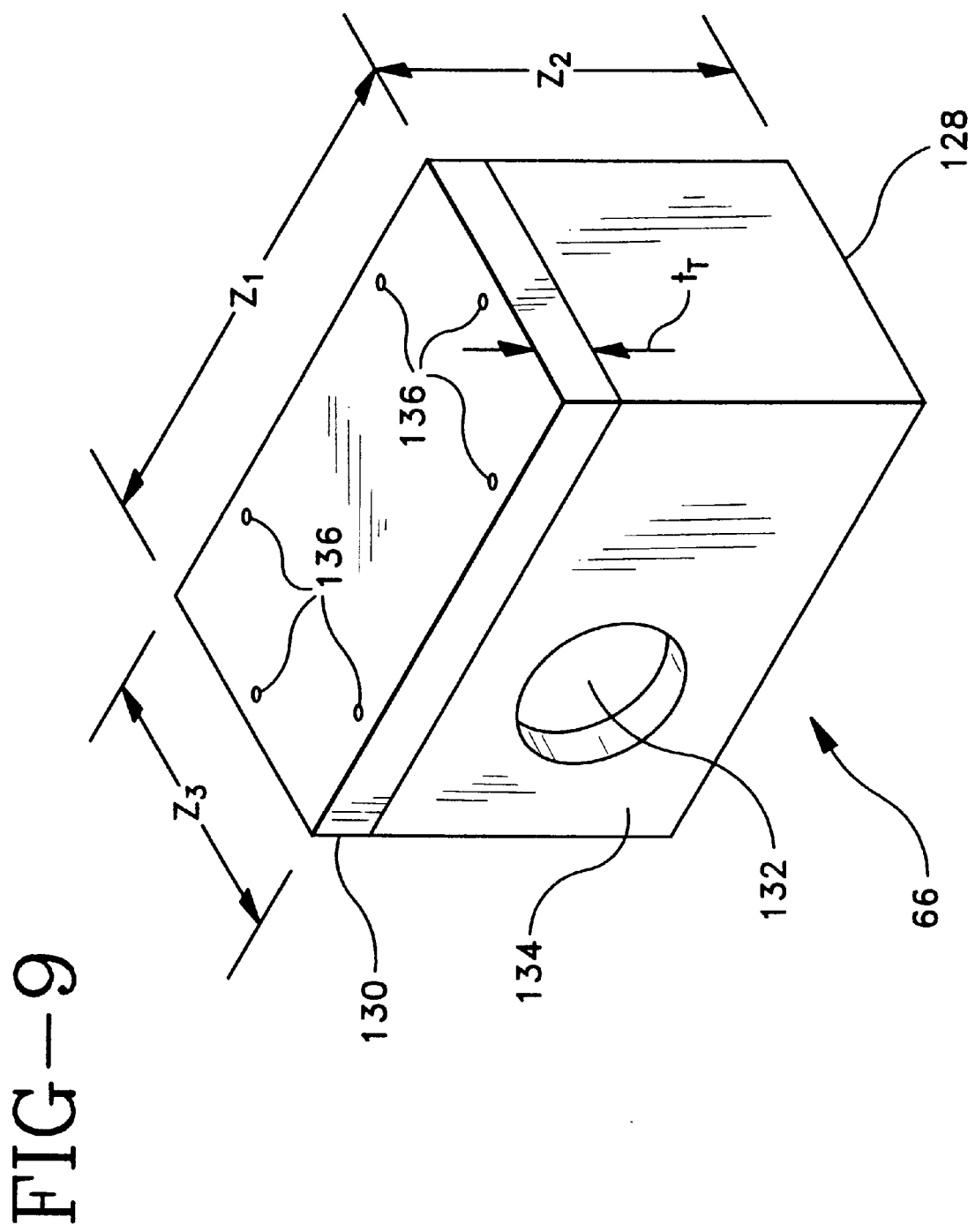
FIG. 9 is a perspective view of a compact housing for a measurement enhancement device of the present invention.

The measurement enhancement device also includes a compact housing 66, as shown in FIGS. 5 and 9, which supports the first beamsplitter 56 and the measurement component 65, and which is configured for attachment to the existing single degree of freedom laser interferometry measurement system. It will be appreciated that the measurement enhancement device provides at least one additional degree of freedom of simultaneous measurement capability for the existing single degree of freedom laser interferometry measurement system.

Referring back to FIG. 4, the measurement component 65 preferably includes a second beamsplitter 68 which splits second beam 62 into third beam 70 and fourth beam 72. Measurement component 65 further preferably includes a position sensing detector 74 which receives third beam 70 and determines first and second straightness errors (e.g. transverse errors such as horizontal and vertical errors) in response to third beam 70. A suitable position sensing detector is model DL-10 available from UDT Sensors, Inc., 12525 Chadron Ave., Hawthorne, Calif. 90250. The following equations are employed to calculate horizontal (x-axis) and vertical (y-axis) straightness errors $S_x$ and $S_y$ respectively:

$$S_x = K_1(x_1-x_2)/(x_1+x_2)$$

$$S_y = K_2(y_1-y_2)/(y_1+y_2)$$

where:

$K_1$ and $K_2$ are constants determined from the dimensions of the position sensing detector 74, which may be further refined by a calibration procedure. Such procedures are well known in the art of laser measurement systems; and $x_1$, $x_2$, $y_1$ and $y_2$ are the outputs of detector 74.

The measurement component 65 still further preferably includes a third beamsplitter 76 which receives fourth beam 72 and splits fourth beam 72 into fifth beam 78 and sixth beam 80. The measurement component still further preferably includes a pitch-sensing device such as first single prism angle sensor 82. Finally, the measurement component preferably includes a yaw-sensing device such as second single prism angle sensor 84. It is to be understood that the pitch and yaw sensing devices may be any type of suitable angular measurement device, such as an auto collimator. Preferably, the pitch and yaw sensing devices are AMIRE-type devices (angle measurement based on the internal reflection effect) as disclosed in U.S. Pat. Nos. 5,220,397 and 5,418,611, which have been previously incorporated herein by reference. Most preferably, the pitch and yaw sensing devices are single prism angle sensors according to the present invention, as described more fully below. Although, as mentioned, prior art devices can be used, the preferred single prism angle sensors, as set forth herein, are far more compact than any known prior art devices, and thus enable the present invention to be configured in a compact housing for use with existing laser interferometry systems.

When single prism angle sensors of the present invention are employed, it is desirable that they both operate with p-polarized light. This is because the reflectance of p-polarized light undergoes a greater change for a unit change in angle of incidence than does the reflectance of s-polarized light. This phenomenon will be discussed further below in connection with FIG. 7. In view of the greater sensitivity to p-polarization, in the measurement enhancement device according to the present invention, it is preferable that both the first and second single prism angle sensors 82, 84 receive p-polarized light. In FIG. 4, second single prism angle sensor 84 will receive p-polarized light directly from third beamsplitter 76. However, without half wave plate 86, first single prism angle sensor 82 would receive s-polarized rather than p-polarized light.

Accordingly, half wave plate 86 is positioned intermediate third beamsplitter 76 and first single prism angle sensor 82 to rotate the polarization of fifth beam 78 so that p-polarized light will enter first single prism angle sensor 82. It is to be understood that, if first sensor 82 were interchanged with second sensor 84, then half wave plate 86 could be provided to rotate the polarization of sixth beam 80, if that beam would normally be s-polarized rather than p-polarized. It is to be appreciated that no half wave plate need be provided for whichever of first sensor 82 and second sensor 84 will directly receive p-polarized light without use of a half wave plate 86.

Note that sensors 82,84 may each include a prism and photodetector, which are shown enclosed in brackets in FIG. 4 to indicate that they are each part of the respective sensor. Further, it should be noted that while the reflectance of p-polarized light is more sensitive to changes in angle of incidence than that of s-polarized light, and thus p-polarized light is generally preferred, s-polarized light yields a wider measurement range, and thus may be preferred in some applications. Yet further, the possibility of operating the present invention with non-polarized light has not been ruled out. Accordingly operation with p-polarized light, s-polarized light, and even non-polarized light should be considered to be within the scope of the invention.

Still referring to FIG. 4, the measurement enhancement device of the present invention preferably also includes a fourth beamsplitter 88 which is positioned to split a reference beam 90 of the existing laser interferometry measurement system to balance the intensity of the reference beam 90 and that portion of the return laser beam 58 which returns to laser head 44 through linear interferometer 54. Use of fourth beamsplitter 88 is desirable, but is not necessary.

Still referring to FIG. 4, the measurement enhancement device of the present invention may also preferably include an ambient light attenuating device such as filter 92 which is positioned to attenuate ambient light which would interfere with accurate operation of the measurement component 65 of the present invention. Filter 92 may be, for example, a band pass interference filter having a peak wavelength at or near 632.8 nm, which is characteristic of the helium neon lasers typically employed with laser interferometry systems. Filter 92 is preferably positioned intermediate linear interferometer 54 and the first beamsplitter 56. Although it has been found possible to operate the measurement enhancement device of the present invention without filter 92, its use has been found desirable, particularly to prevent interference of ambient light with the measurement component 65 of the present invention.

Figure 6:
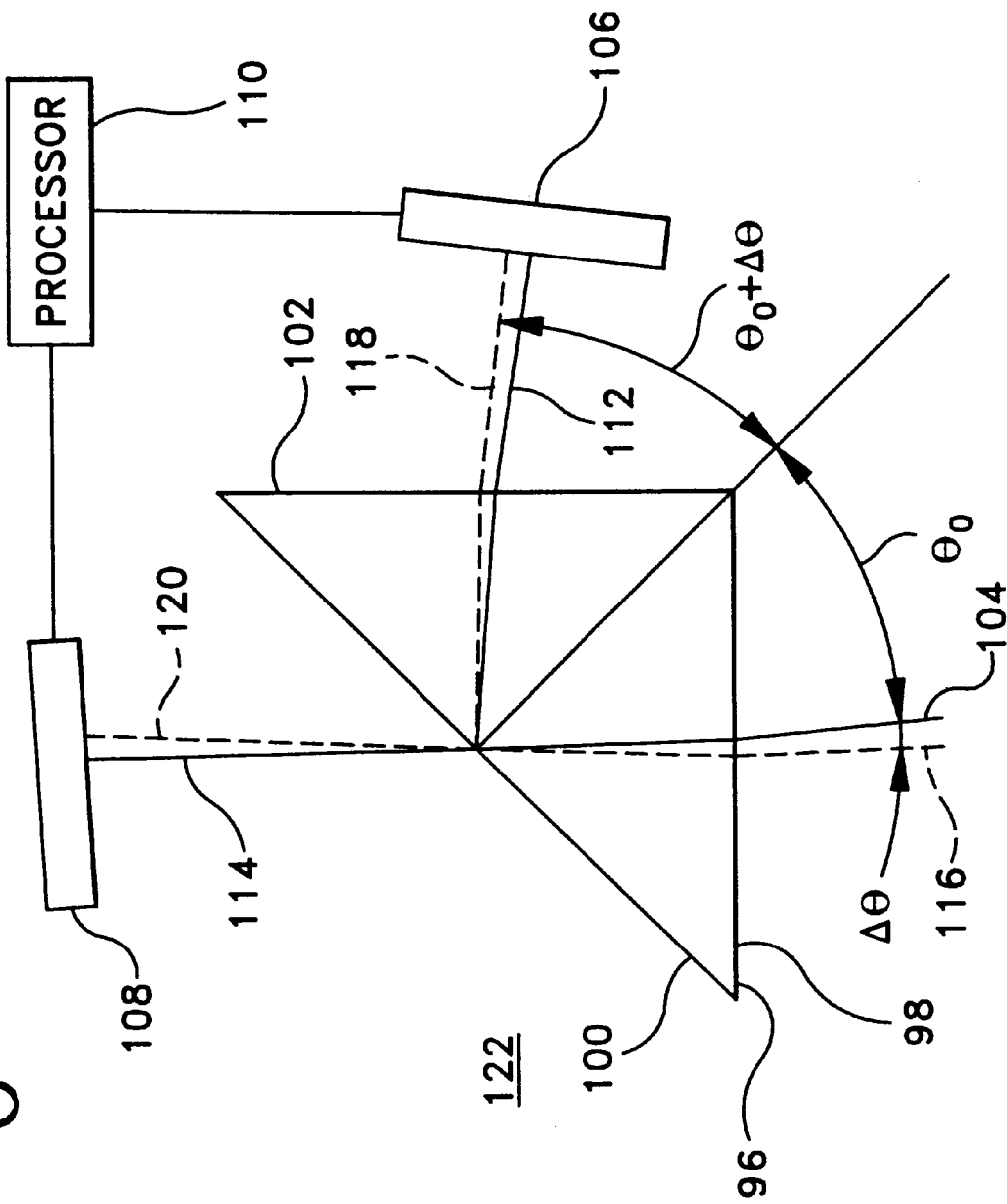
FIG. 6 is a schematic diagram of an apparatus for measuring angles in accordance with the present invention.

Referring now to FIG. 6, there is depicted an apparatus for measuring angles which is a preferred form of single prism angle sensor in accordance with the present invention. The apparatus can be used in any type of optical angular measurement application. The apparatus includes a prism 96 having at least three surfaces including an input surface 98, an interface/measuring surface 100, and an exit surface 102. Prism 96 is configured to receive an input light beam 104 through input surface 98. At least a portion of input light beam 104 passes through prism 96 and is reflected from interface/measuring surface 100 and out through exit surface 102. It will be appreciated that interface/measuring surface 100 forms an interface between the prism material, typically glass, and a surrounding material such as air 122. When input light beam 104 strikes interface/measuring surface 100, a portion is reflected as reflected light beam 112, and a portion is transmitted as transmitted light beam 114. As is described in the previously mentioned U.S. Pat. Nos. 5,220, 397 and 5,418,611, both to Huang et al., the disclosures of which have been previously incorporated herein by reference, the amount of light which is reflected as reflected beam 112 and the amount which is transmitted as transmitted beam 114 depends on the angle of incidence $\theta_0$.

FIG. 6 shows a right angle prism. Right angle prisms are inexpensive and yield acceptably accurate results. It would be possible to use an obtuse-angle prism. In such a prism, the angle opposite the interface/measuring surface is obtuse, and is selected so that reflected beam 112 will strike exit surface 102 substantially perpendicularly, thereby minimizing any refraction or reflection at the exit surface. When using p-polarized light with the present invention, the right angle prism is sufficiently accurate (because the measurement range is relatively small) and it should not be necessary to use the obtuse angle prism.

It is to be appreciated that even when a beam is incident on a surface at a perpendicular angle, there can still be as much as 4% reflection for regular glass. For an additional cost, when greater accuracy is required, an anti-reflection coating can be applied to reduce the reflection down to about 0.2 %. The paper by P. S. Huang and J. Ni entitled "Angle Measurement Based on the Internal-Reflection Effect and the Use of Right-Angle Prisms," APPLIED OPTICS v.34 n.22 (Aug. 1, 1995) sets forth various considerations in the use of right angle prisms in prior-art AMIRE-type devices.

The apparatus for measuring angles also includes an intensity comparator which determines a parameter S which is equal to a ratio of the intensity of input beam 104 to that of reflected beam 112, and which relates the parameter S with a quasi-linearized slope parameter K, determined in a region of optimum S-parameter linearity and acceptable S-parameter sensitivity, to obtain the angle to be measured. (Determination of S and K is discussed fully below.) The intensity comparator preferably includes a first intensity measurer such as first photodetector 106, which directly measures the intensity of reflected beam 118 and forms a first output indicative of the reflected beam intensity. The intensity comparator still further preferably includes a second intensity measurer such as second photodetector 108, which directly measures the intensity of transmitted beam 114 and forms a second output indicative of the transmitted beam intensity. A suitable type of photodetector (photodiode) for use as either detector 106 or 108 is part number S1227-1010BR available from Hamamatsu Corporation, 360 Foothill Road, Bridgewater, N.J. 08807-0910. The photodetectors should preferably be oriented perpendicularly to the nominally incident beams.

Finally, the intensity comparator preferably includes an S-parameter determinator such as processor 110 which receives the first and second outputs from the first and second intensity measurers, and which forms an output from a ratio of the sum of the first and second outputs to the first output. The S and K parameters will be discussed more fully below. Still referring to FIG. 6, it will be seen that a displaced input light beam 116, displaced by an amount $\Delta\theta$, will reflect from interface/measuring surface 100 to form a displaced reflected beam 118 with a remaining displaced transmitted beam 120. Since a slight change in the angle of incidence will result in a significant change in the reflectance, as disclosed in the previously mentioned patents to Huang et al., the change in intensity of the reflected beam 118 as compared to beam 112 can be used to determine the value of the angle $\Delta\theta$.

It will be appreciated that when the device of FIG. 6 is employed as item 82 and 84 of FIG. 4, a respective one of the fifth and sixth beams 78, 80 will correspond to the input beam 104 (or to the displaced input beam 116, depending on the value of the angle to be measured). It will be further appreciated that the angle $\Delta\theta$ to be determined will respectively be one of the pitch angle and the yaw angle to be measured.

Still referring to FIG. 6, it will be appreciated that the transmitted beam 114 and displaced transmitted beam 120 refract at the interface/measuring surface 100 due to the different indices of refraction between the material of prism 96 and the surrounding air 122. Refraction also occurs at surfaces 98 and 102, but is of a small amount and does not significantly affect the measurement accuracy.

Still referring to FIG. 6, it will be appreciated that a method for measuring angles in accordance with the present invention includes the steps of determining intensity of a first light beam 104 which impinges on an interface/measuring surface 100 of a prism 96 and which has a first light beam intensity, determining intensity of a second light beam 112 which reflects from interface/measuring surface 100 when first beam 104 impinges thereon, the second light beam having a second light beam intensity, comparing the first light beam intensity and the second light beam intensity to obtain a parameter S which is equal to the ratio of the first light beam intensity to the second light beam intensity, and relating the parameter S with a quasi-linearized slope parameter K (preferably determined in a region as set forth above) to provide a value of an angle to be measured, such as the angle $\Delta\theta$.

Most preferably, the method comprises the additional step of directly measuring intensity of a third light beam 114 which is transmitted through interface/measuring surface 100 of prism 96 when first beam 104 impinges thereon. The third light beam 114 has a third light beam intensity. The step of determining the intensity of the second light beam 112 preferably includes directly measuring its intensity, and the step of determining intensity of the first light beam 104 preferably includes summing the intensity of second light beam 112 and third light beam 114. Note that, throughout this discussion, the input light beam will be 104, the transmitted beam 114 and the reflected beam 112 for no angular displacement; when such displacement is present, the input beam will be 116, transmitted beam 120 and reflected beam 118.

U.S. Pat. Nos. 5,220,397 and 5,418,611, previously incorporated herein by reference, disclose a technique for increasing the sensitivity of angular measurement with AMIRE-type devices by use of multiple reflections. Additional details regarding such sensitivity enhancement are provided in the article by P. S. Huang and J. Ni entitled "Angle Measurement Based on the Internal-reflection Effect Using Elongated Critical-angle Prisms," APPLIED OPTICS v. 35 n. 13 (May 1, 1996). Such enhancement techniques can be advantageously adapted to the present invention.

The preceeding description of FIG. 6 has been based on a method wherein second photodetector 108 is used to directly measure the intensity of the transmitted light beam 114, for purposes of calculating the parameter S. This has been found to be a preferred method, due to accuracy advantages. However, an alternative method can also be employed. Instead of summing the readings of photodetectors 106,108, to obtain the intensity of input light beam 104, it is possible to instead obtain the intensity of beam 104 by summing outputs $y_1$ and $y_2$ (or $x_1$ and $x_2$) of the position sensing detector 74, to obtain a quantity designated as SUM. In this case, the pitch angle $\theta_p$ and the yaw angle $\theta_y$ are calculated as follows:

$\theta_p = K_3(\text{SUM})/I_1$ $\theta_y = K_4(\text{SUM})/I_2$.

The quantities $y_1$ and $y_2$ (and $x_1$ and $x_2$) are the previously-mentioned output signals of the position sensing detector 74. $I_1$ and $I_2$ are, respectively, the output signals of the first photodetectors 106 of the first single prism angle sensor 82 and the second single prism angle sensor 84. $K_3$ and $K_4$ are constants to be determined by calibration as is well known in the art. Of course, other methods of determining the intensity of input light beam 104 may be employed. For example, beam 104 can be passed through a beamsplitter and the intensity of the split portion of the beam (equal to that of the beam which will be incident on the prism 96) can be measured directly.

Figure 7:
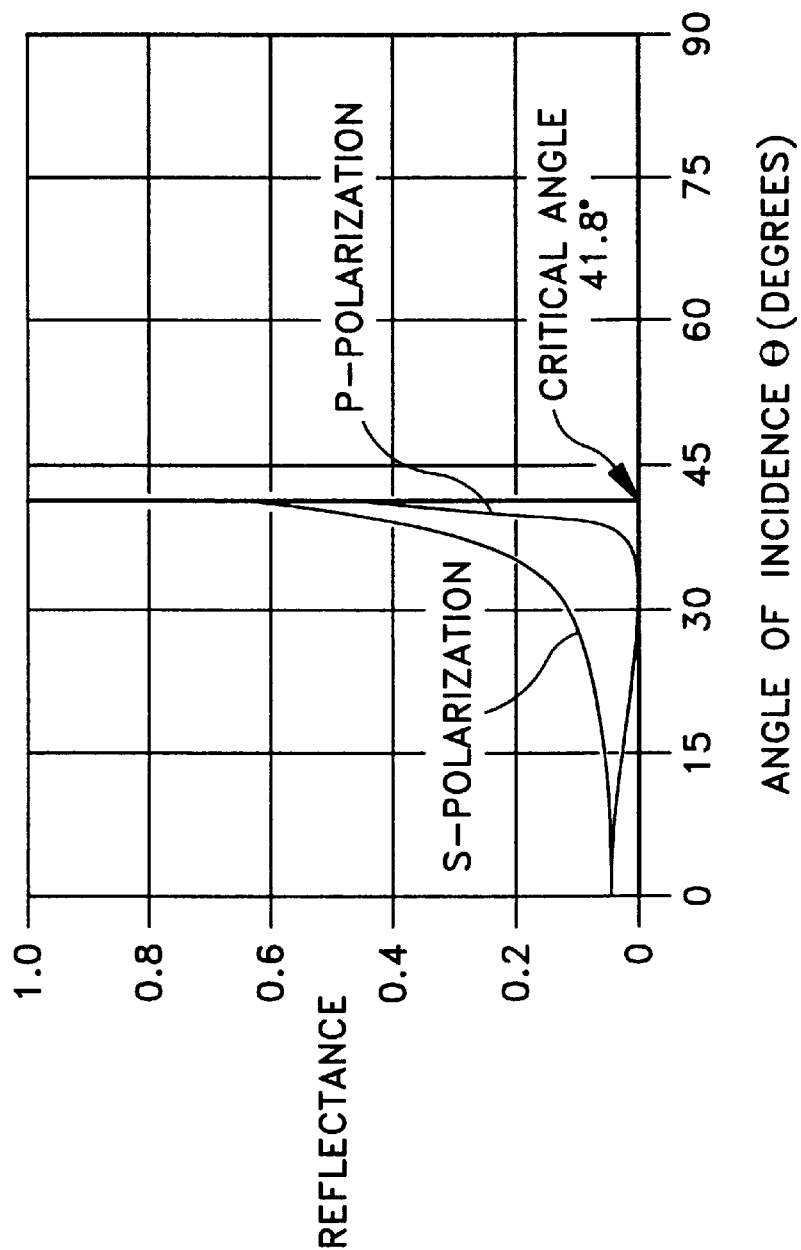
FIG. 7 is a plot of reflectance against angle of incidence as known in the prior art.

FIG. 7 shows plots of reflectance versus angle of incidence for both s-polarized and p-polarized light, as is known in the prior art. The numerical values in FIG. 7 are calculated for a glass-air interface wherein the glass has an index of refraction $n_g=1.5$ and the air has an index of refraction $n_a$ of approximately 1.0. For angles of incidence greater than the critical angle of 41.8 degrees, total internal reflection will occur and the reflectance will take on a value of 1. It will be seen that as the angle of incidence approaches the critical angle, the slope of the curves becomes quite sharp. This is especially true for the p-polarized curve. Accordingly, p-polarized light is preferred for measuring angles using the internal reflection principle, since a greater change in reflectance is noted for an identical change in angle of incidence, between the s-polarized and p-polarized curves.

Heretofore, the nonlinearity inherent in the curves of FIG. 7 has required complex systems for correction, typically involving a beamsplitter and two prisms. Such systems are described in the previously mentioned U.S. Pat. Nos. 5,418,611 and 5,220,397, both to Huang et al., the disclosures of which have been previously incorporated herein by reference. It has now been discovered that the internal reflection effect can be used to measure angle with only a single prism, if the results are correlated by plotting a parameter S, which is the inverse of reflectance, as a function of angle of incidence.

Figure 8:
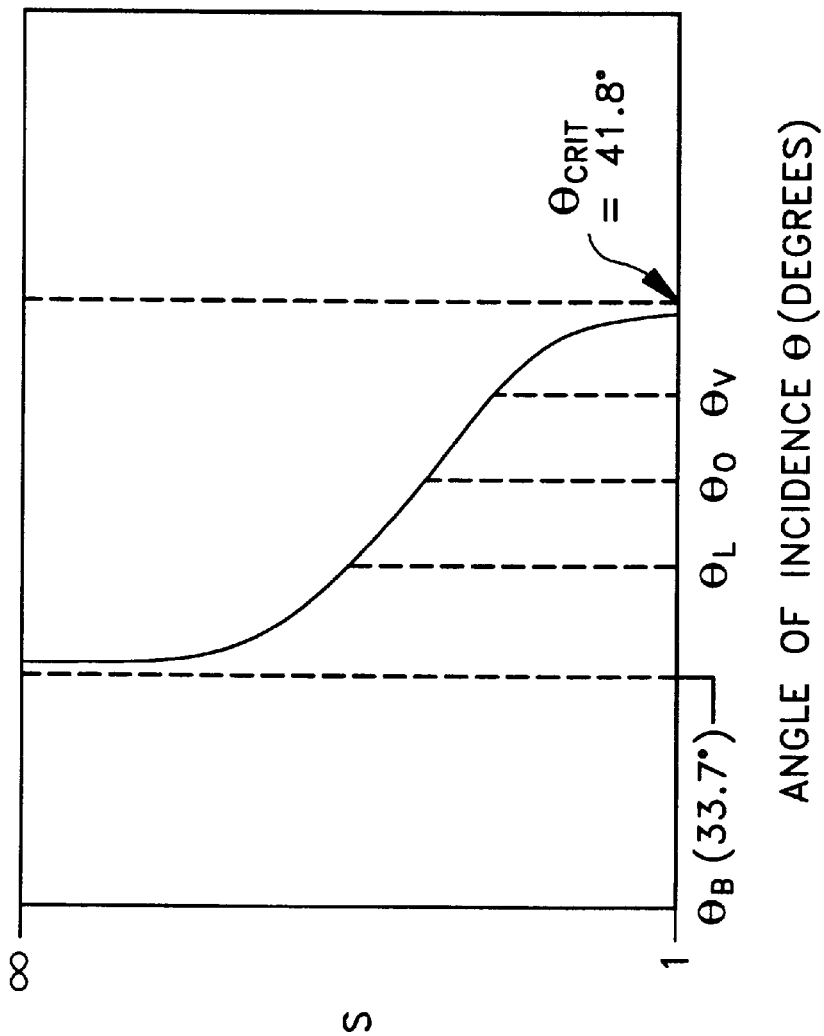
FIG. 8 is a plot of the parameter S versus angle of incidence as developed in the present invention.

Referring now to FIG. 8, it can be seen that the parameter S approaches a value of 1 at the critical angle of 41.8 degrees, and tends towards infinity at the Brewster angle $\theta_B$ (about 33.7 degrees for this case) where the p-polarization curve exhibits a reflectance of zero. Note that the plot in FIG. 8 is for p-polarized light. Between the $\theta_B$ value and the value of $\theta_{crit}$, the S-parameter curve exhibits a region wherein it is essentially a straight line. This will occur about an angle $\theta_0$, which is located substantially in the middle of the essentially linear region. The essentially linear region will have an upper bound $\theta_U$ and a lower bound $\theta_L$. It is to be understood that the 36 degree limit shown in FIG. 8 is specifically for the case of a glass air interface as set forth in FIG. 7. Different values will be obtained for other types of interfaces, however, the technique described herein is applicable to any type of prism interface.

In order to employ the technique according to the invention, the first step is to calculate a theoretical value for $\theta_0$ about which the S-parameter curve is approximately linear. This should be done by locating the turning point of the S curve, which satisfies the following equation:

$$\frac{d^2(1/R(\theta_i))}{d\theta^2_i} = 0$$

where the second derivative is evaluated at $\theta_i=\theta_0$ and where:

for s-polarized light, $R(\theta_i)=R_s(\theta_i)=((\sin (\theta_i-\theta_r))/\sin(\theta_i+\theta_r)))^2$ for p-polarized light, $R(\theta_i)=R_p(\theta_i)=((\tan(\theta_i-\theta_r))/\tan(\theta_i+\theta_r)))^2$ $\theta_i$=angle of incidence within prism $\theta_r$=angle of refraction in air (or other surrounding medium)

and $\theta_i$ and $\theta_r$ are related by Snell's law:

$n_i \sin \theta_i = n_r \sin \theta_r$.

Note that $S=1/R(\theta_i)$, $n_i$=refractive index of prism material, and $n_r$=refractive index of air or other surrounding medium.

Now, having obtained a theoretical value for $\theta_0$, a single prism angle sensor should be assembled in accordance with FIG. 6, with the value of angle of incidence $\theta$ selected to agree with the calculated value of $\theta_0$. The value of the S parameter should be calculated from the outputs of first and second photodetectors 106 and 108 according to the formula $S=(I_a+I_b)/I_a$. $I_a$ is the output of first photodetector 106, and $I_b$ is the output of second photodetector 108. Next, the angle of incidence $\theta$ should be perturbed about the value of $\theta_0$ by a number of small changes $\Delta\theta$, and in each case, the value of the parameter S should be calculated in order to generate the curve of FIG. 8. Once the substantially linear portion of the curve of FIG. 8 has been generated, the value of parameter S can be related to the magnitude of the change in angle of incidence $\Delta\theta$ by a simple linear weighting factor K, such that $S=K \Delta\theta$. It will be appreciated that K is a quasi-linearized slope parameter which is obtained in the region of optimum S-parameter linearity and acceptable S-parameter sensitivity, that is, about the point $\theta_0$.

Referring back to FIGS. 6 and 7, an alternative apparatus and method for angular measurement, in accordance with the present invention, will be discussed. In the alternative apparatus, the intensity comparator determines a value of reflectance R equal to the ratio of the intensity of reflected beam 112 (or displaced reflected beam 118) to that of the input beam 104 (or displaced input beam 116). The R value is then correlated via a non linear interpolation scheme to obtain an angle to be measured. That is, a non linear curve fit, such as a second order or higher polynomial, an exponential or logarithmic fit, etc., is made for the reflectance-$\theta$ curve of FIG. 7 (in the region where $\theta$ is expected to fall), and a value of $\Delta\theta$ is determined from the curve fit, based on the measured R. This solution can be implemented in hardware, software, or both. For example, processor 110 can store appropriate curve fit coefficients, and calculate $\Delta\theta$ from the measured R value. The intensity comparator of this apparatus comprises the detectors 106, 108 and the processor 110. A method employing this approach comprises the steps of determining intensity of a first light beam 104 or 116 which impinges on interface/measuring surface 100 of prism 96, determining intensity of a second light beam 112 or 118 which reflects from surface 100 when beam 104 or 106 impinges thereon, comparing the first and second light beam intensities to obtain a value of reflectance R equal to the ratio of the second beam intensity to the first beam intensity, and correlating the value of R via the above-described non linear interpolation scheme to obtain an angle to be measured. In both the alternative apparatus and method, the input beam intensity is preferably determined by summing the reflected and transmitted beam intensities, but any of the above-described techniques can also be used.

Referring now to FIG. 5, integration of the measurement enhancement device of the present invention with an existing single degree of freedom laser interferometry system is illustrated. The existing system includes laser head 44, stationary retroreflector 52 mounted on first stand 124, and moving retroreflector 42 mounted on second stand 126. Linear interferometer 54, which is also a part of the existing laser system, is also mounted on first stand 124. Fourth beamsplitter 88, when employed, is preferably mounted between stationary retroreflector 52 and linear interferometer 54 in a suitable housing. It is to be understood that the item designated as 88 may include both the fourth beamsplitter and its housing. The remainder of the components of the measurement enhancement device are contained within compact housing 66 which is secured to the second stand 126 of the existing interferometer system. Filter 92, when employed, may be secured to the outside surface of compact housing 66 as shown.

FIG. 9 shows an enlarged perspective view of compact housing 66 which is particularly adapted for use with a Hewlett Packard Model HP5529A dynamic calibrator. Housing 66 is preferably formed from a main body 128 and cover 130. The dimensions of housing 66 are preferably: $Z_1$ about 80 millimeters, $Z_2$ about 50 millimeters, and $Z_3$ about 50 millimeters. The thickness of cover 130 is preferably about 12 millimeters. Cover 130 may be secured to main body 128 by fasteners 136. Main body 128 is formed with an opening 132 to permit entrance of the laser light beams, with a corresponding opening (not shown) on the far side to permit exit of the light beams into the moving retroreflector 42. The surface of main body 128 about opening 132 may be formed as a filter-mounting region 134, in order to receive filter 92. Housing 66 may be formed with any appropriate hole or fastener pattern, in order to permit housing 66 to be easily secured to second stand 126 of the existing interferometer system. Such stands are well known in the art, as exemplified by the Hewlett Packard HP 10785A height adjuster/post and the HP 10784A base. They may be equipped with, for example, four captive M3×0.5 mounting screws arranged in a 30.0 mm square pattern.

Referring back now to FIG. 4, operation of the laser measurement system for rapid calibration of machine tools will now be described. Output beam 64 leaves laser head 44 and passes through linear interferometer 54 where it is split into two beams. The first of these is reflected from stationery retroreflector 52 as reference beam 90, which passes through fourth beamsplitter 88 to reduce its intensity by ½ in order to match that of the first beam 60 which reflects from moving retroreflector 42 and passes back through linear interferometer 54 into laser head 44. The portion of beam 64 which passes through linear interferometer 54, rather than being reflected by it, then passes through filter 92 and is incident upon moving retroreflector 42, from which it reflects as return laser beam 58. Beam 58 enters first beamsplitter 56, where it splits into first beam 60, which, as previously noted, returns to laser head 44, and second beam 62. Second beam 62 is in turn split in second beamsplitter 68, forming a third beam 70 which impinges on position sensing detector 74, and a fourth beam 72 which enters third beamsplitter 76. Position sensing detector 74, as noted, determines two transverse straightness errors, such as, for example, x (horizontal) straightness and y (vertical) straightness for a linear distance displacement along a z axis.

Fourth beam 72 enters third beamsplitter 76 where it is split into fifth beam 78 and sixth beam 80. Fifth beam 78 enters first single prism angle sensor 82, where pitch is sensed, using the principles described above. Sixth beam 80 enters second single prism angle sensor 84, where yaw is measured as described above. It is to be understood that the straightness errors measured by position sensing detector 74, the pitch error measured by sensor 82, and the yaw error measured by sensor 84 are all determined substantially simultaneously with the linear distance error measured by the existing system of laser head 44, linear interferometer 54, stationary retroreflector 52, and moving retroreflector 42. It is also to be understood that, while operation of the present system has been described based on an existing laser interferometry system which is set up to measure linear distance error, it would be possible to set up the existing laser interferometry system to measure any of the other desired errors, and then to configure a measurement enhancement device in accordance with the present invention to measure the remaining errors. However, for simplicity, it is believed that setting up the existing single degree of freedom laser interferometry measurement system to measure linear distance is the preferred approach.

Existing laser interferometry measurement systems are frequently equipped with computer controls to aid in data storage, reduction and analysis. Systems can be provided which record data, prompt the user to move the machine tool component in question to various measurement locations in an orderly fashion, and which store data for later plotting or other graphical analysis. Plotting capability is typically also included in the software. One prior art device is described in the article "A New Microcomputer-Controlled Laser Dimensional Measurement and Analysis System" by Robert C. Quenelle and Lawrence J. Werz, which appeared in the April 1983 issue of the *Hewlett-Packard Journal*.

Appropriate computer hardware and software can be provided to enhance the ease of operation for the present invention. In particular, software can be provided to collect data from both the existing instrument and the add-on measurement enhancement device of the present invention. The software can also be employed to process the various signals associated with the various sensors, including performing averaging and filtering functions. Further, the appropriate software and hardware can be employed to display results in either a tabular or graphical fashion. Software can also be provided which provides a help capability, preferably interactive, to instruct the user of a system how to employ the system and make appropriate measurements. Graphical diagrams showing appropriate setups can also be provided. Further, a signal indicator can be provided to help with alignment of the system components.

When the apparatus for measuring angles of the present invention is employed in a stand-alone mode, as, for example, a control sensor, it may be desirable to implement any required processing schemes in a hardware-only solution. Conversely, when the measurement enhancement device of the present invention is used with an existing laser interferometry system, processing schemes may be advantageously implemented at the software level, preferably by software which is compatible with the personal computer used to control most current laser interferometry systems, and most preferably by software which can be integrated with existing control software.

While there have been described what are presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. A measurement enhancement device for use in conjunction with a single degree of freedom laser interferometry measurement system to enable said system to simultaneously measure more than one degree of freedom, said measurement enhancement device comprising:
    a first beamsplitter which splits a laser beam of said measurement system into a first beam for use by an existing component of said system and a second beam for use by said measurement enhancement device;
    a measurement component which simultaneously receives said second beam for determination of a measurement value for at least a second degree of freedom in response to said second beam; and
    a compact housing which supports said first beamsplitter and said measurement component and which is configured for attachment to said system;
    wherein said measurement component comprises:
        a second beamsplitter which splits said second beam into third and fourth beams;
        a position sensing detector which receives said third beam and determines first and second straightness errors in response thereto;
        a third beamsplitter which receives said fourth beam and splits said fourth beam into fifth and sixth beams;
        a pitch-sensing device which receives said fifth beam and determines a pitch measurement in response thereto; and
        a yaw-sensing device which receives said sixth beam and determines a yaw measurement in response thereto;
    whereby said measurement enhancement device provides at least one additional degree of freedom of simultaneous measurement capability for said system.

2. The measurement enhancement device of claim 1, wherein:
    said pitch-sensing device comprises a first single prism angle sensor; and
    said yaw-sensing device comprises a second single prism angle sensor.

3. The measurement enhancement device of claim 2, wherein one of said first and second single prism angle sensors is configured to directly receive a respective one of said fifth and sixth beams as a p-polarized beam, and wherein said measurement component further comprises a half-wave plate positioned intermediate said third beamsplitter and another of said first and second single prism angle sensors to rotate polarization of another respective one of said fifth and sixth beams to p-polarization.

4. The measurement enhancement device of claim 3, wherein each of said first and second single prism angle sensors comprises:
    a prism having at least three surfaces including an input surface, an interface/measuring surface, and an exit surface, said prism configured to receive a respective one of said fifth and sixth beams as an input light beam through said input surface, at least a portion of which passes through said prism and is reflected from said interface/measuring surface and out through said exit surface; and
    an intensity comparator which determines a parameter S equal to a ratio of an input beam intensity to a reflected beam intensity and which relates said parameter S with a quasi-linearized slope parameter K, determined in a region of optimum S-parameter linearity and acceptable S-parameter sensitivity, to obtain one of a pitch angle and a yaw angle to be measured.

5. The measurement enhancement device of claim 4, wherein said intensity comparator includes:

a first intensity measurer which directly measures said reflected beam intensity and forms a first output indicative thereof;

a second intensity measurer which directly measures a transmitted beam intensity and forms a second output indicative thereof; and an S-parameter determinator which forms an output from a ratio of a sum of said first and second outputs to said first output.

6. The measurement enhancement device of claim 1, further comprising an ambient light attenuating device positioned to attenuate ambient light which would interfere with accurate operation of said measurement component.

7. The measurement of enhancement device of claim 1, further comprising a fourth beamsplitter positioned to split a reference beam of said laser interferometry measurement system to balance intensity of said reference beam and said first beam.

8. An apparatus for measuring angles, said apparatus comprising:

a prism having at least three surfaces including an input surface, an interface/measuring surface, and an exit surface, said prism configured to receive an input light beam through said input surface, at least a portion of which passes through said prism and is reflected from said interface/measuring surface and out through said exit surface; and an intensity comparator which determines a parameter S equal to a ratio of an input beam intensity to a reflected beam intensity and which relates said parameter S with a quasi-linearized slope parameter K, determined in a region of optimum S-parameter linearity and acceptable S-parameter sensitivity, to obtain an angle to be measured.

9. The apparatus of claim 8, wherein said intensity comparator includes:

a first intensity measurer which directly measures said reflected beam intensity and forms a first output indicative thereof;

a second intensity measurer which directly measures a transmitted beam intensity and forms a second output indicative thereof; and an S-parameter determinator which forms an output from a ratio of a sum of said first and second outputs to said first output.

10. A method for measuring angles, said method comprising the steps of:

determining intensity of a first light beam which impinges on an interface/measuring surface of a prism, said first light beam having a first light beam intensity;

determining intensity of a second light beam which reflects from said interface/measuring surface when said first beam impinges thereon, said second light beam having a second light beam intensity;

comparing said first light beam intensity and said second light beam intensity to obtain a parameter S equal to a ratio of said first light beam intensity to said second light beam intensity; and relating said parameter S with a quasi-linearized slope parameter K, determined in a region of optimum S-parameter linearity and acceptable S-parameter sensitivity, to provide a value of an angle to be measured.

11. The method of claim 10, further comprising the additional step of directly measuring intensity of a third light beam which is transmitted through said interface/measuring surface of said prism when said first beam impinges thereon, said third light beam having a third light beam intensity; wherein:

said step of determining intensity of said second light beam includes directly measuring said second light beam intensity; and said step of determining intensity of said first light beam includes summing said second light beam intensity and said third light beam intensity.

12. An apparatus for measuring angles, said apparatus comprising:

a prism having at least three surfaces including an input surface, an interface/measuring surface, and an exit surface, said prism configured to receive an input light beam through said input surface, at least a portion of which passes through said prism and is reflected from said interface/measuring surface and out through said exit surface; and an intensity comparator which determines a value of reflectance R equal to a ratio of a reflected beam intensity to an input beam intensity and which correlates said value of reflectance R via a non linear interpolation scheme to obtain an angle to be measured.

13. A method for measuring angles, said method comprising the steps of:

determining intensity of a first light beam which impinges on an interface/measuring surface of a prism, said first light beam having a first light beam intensity;

determining intensity of a second light beam which reflects from said interface/measuring surface when said first beam impinges thereon, said second light beam having a second light beam intensity;

comparing said first light beam intensity and said second light beam intensity to obtain a value of reflectance R equal to a ratio of said second light beam intensity to said first light beam intensity; and correlating said value of reflectance R via a non linear interpolation scheme to obtain an angle to be measured.

* * * * *